March 9, 1926. 1,575,655
L. A. STINSON
CONVEYING APPARATUS
Filed Jan. 13, 1923 2 Sheets-Sheet 1
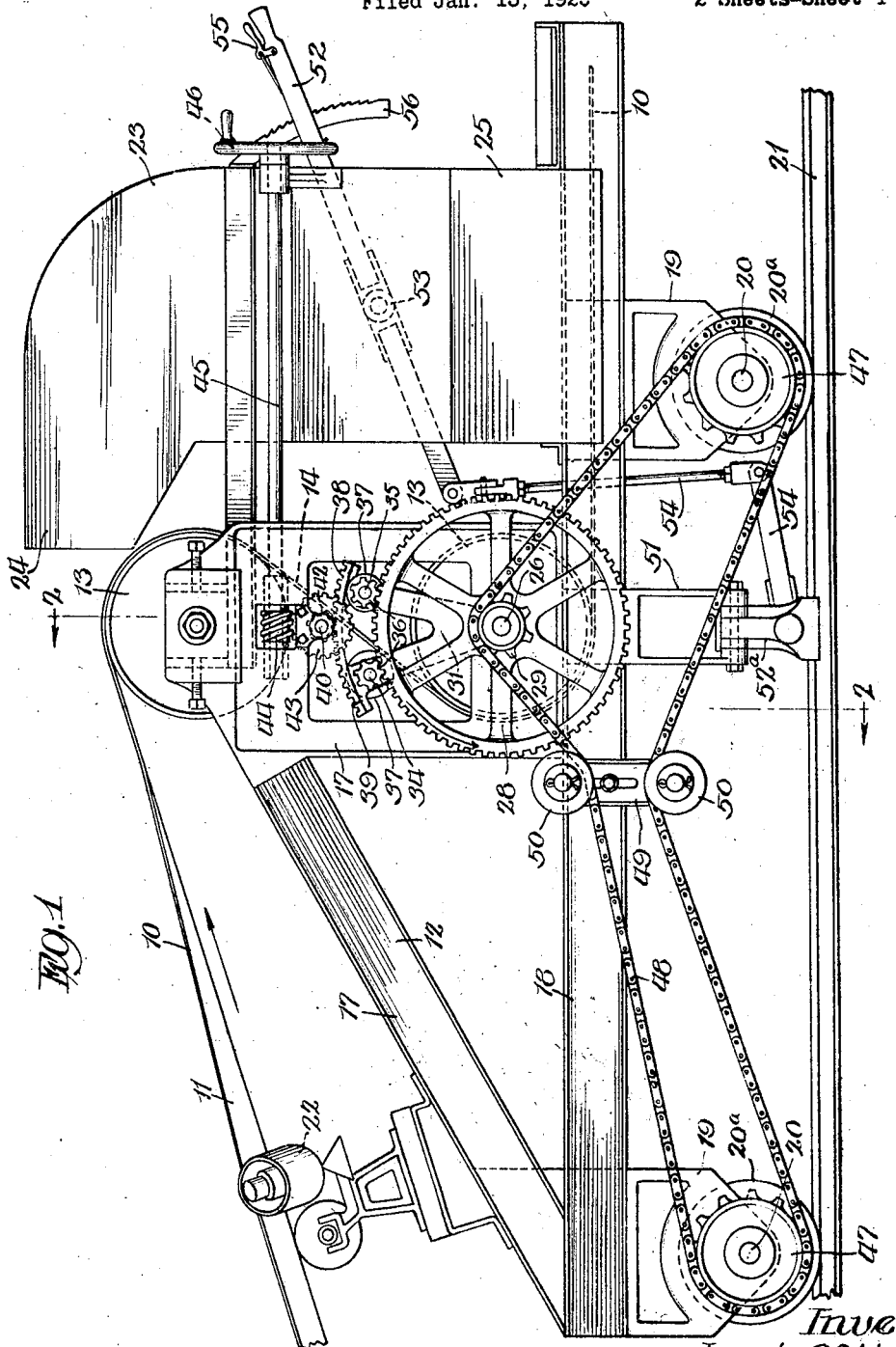

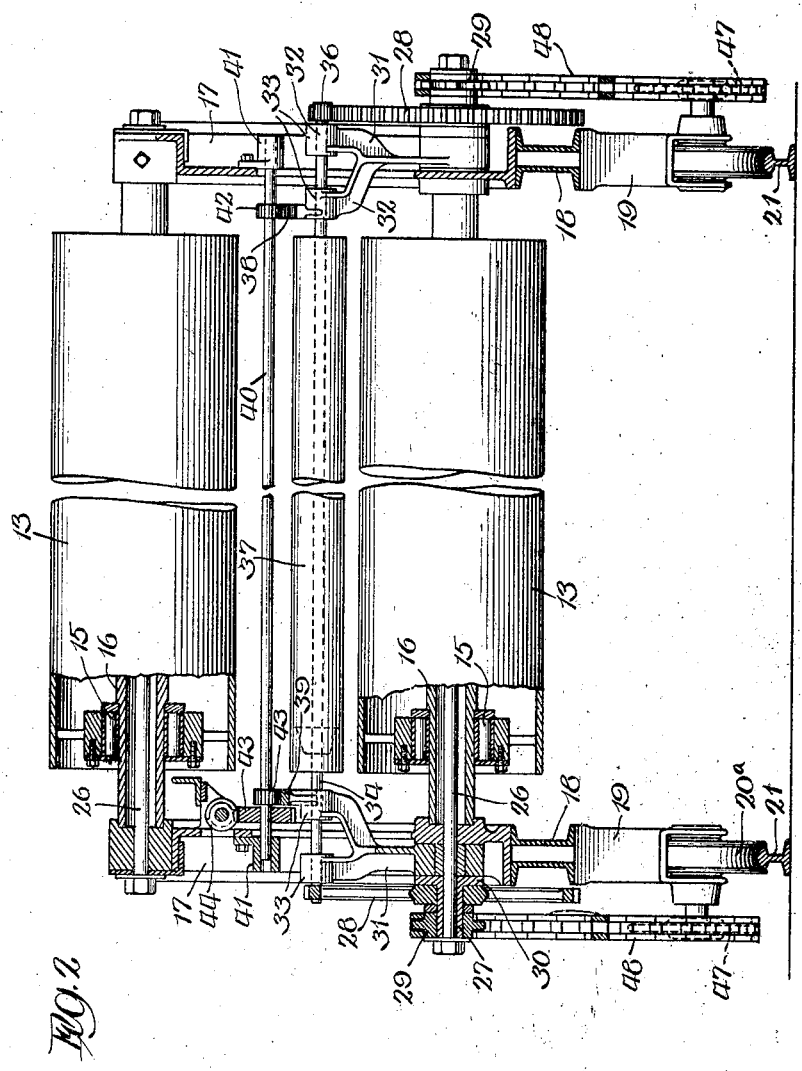

Patented Mar. 9, 1926.

1,575,655

UNITED STATES PATENT OFFICE.

LEWIS A. STINSON, OF OAK PARK, ILLINOIS, ASSIGNOR OF FORTY-NINE ONE-HUN-DREDTHS TO AUGUSTUS T. PERKINS, OF CHICAGO, ILLINOIS.

CONVEYING APPARATUS.

Application filed January 13, 1923. Serial No. 612,482.

*To all whom it may concern:*

Be it known that I, LEWIS A. STINSON, a citizen of the United States, residing at Oak Park, in the county of Cook and State of Illinois, have invented certain new and useful Improvements in Conveying Apparatus, of which the following is a specification.

This invention relates to improvements in belt conveyer apparatus.

A belt conveyer of the type now in common use for loading grain and the like into ships, railway cars, and other conveyances, is illustrated in the drawings, wherein rollers are provided intermediate the extreme end rollers of the apparatus for the purpose of forming a reverse lap portion in the conveying run of the belt, this being to provide for the discharge, intermediate said end rollers, into a delivery chute or the like of the material being conveyed, and, furthermore, so that said chute and lap-forming rollers may be moved as a unit longitudinally of the belt for the purpose of positioning said chute at various points intermediate said end rollers without altering the position of the latter or the tension of the belt, and without changing the position of said chute with respect to said lap portion.

Heretofore in conveying apparatus of this type the chute and lap-forming rollers have been adjusted or moved back and forth to the desired positions by hand or by various types of propelling mechanisms, all of which have proved unsatisfactory.

One object of the invention contemplates the provision of a novel form of driving mechanism for these elements. Another object of the invention is to provide means for utilizing power derived from the belt for operating the chute and lap-forming rollers.

A further object is to provide a driving mechanism for the parts named in apparatus of the class described which shall be simple in construction and operation, positive in action, and capable of both a forward and reverse drive transmission.

Other objects and advantages will be apparent to those skilled in the art from a reading of the following specification, taken in connection with the accompanying drawings, wherein one form of the invention is illustrated.

In the drawings—

Figure 1 is a side elevation of a belt conveyer of the type named, showing the driving mechanism of the present improvements operatively associated therewith; and Fig. 2 is a sectional view, taken on the line 2—2 of Fig. 1.

Referring more in detail to the drawings, the conveyer belt is shown at 10, said belt passing over fixed rollers (not shown) mounted near opposite ends of the track over which the apparatus operates and, providing the usual forwardly moving conveyer run 11 and the reversely moving or return run—not shown.

A carriage 12 is positioned intermediate the end rollers and carries a plurality of lap-forming rollers 13, these rollers co-operating with the forwardly moving run of the belt to provide therein the reverse lap portion 14, substantially Z-shaped in side elevation, as best shown in Fig. 1. The rollers 13 are rotatably mounted upon roller bearings 15 carried by the elongated sleeves 16, supported at their opposite ends in suitable recesses provided in the side frame members 17, which extend upwardly from the base 18 of the carriage 12 on either side of the belt. The carriage is provided with two pairs of depending brackets 19, in which axles 20 are suitably journalled, the latter carrying flanged wheel 20ᵃ which engage and roll upon the track 21. Means, in the form of relatively inclined rollers 22, are carried by said frame members 17 of the carriage and co-operate with the conveying run 11 of the belt to render the same V-shaped in cross section, so as to better carry the material conveyed, as will be readily understood by those skilled in the art. The material is fed to the belt at the extreme left end of the apparatus, as viewed in Fig. 1, and the belt caused to travel in the direction of the arrow in said figure by means of power derived from any suitable source, not shown.

Supported upon the carriage 12, adjacent its forward end, is shown an enclosed delivery chute 23, the receiving end 24 thereof being mounted in close juxtaposition to the periphery of the upper lap-forming roller 13, so that as the belt rounds said roller the material thereon will be discharged into said chute, from whence it will fall by gravity downward through the same and be delivered out through the lower outlet opening 25 into the ship or other conveyance into which it is desired to load the same. The lower portion of the chute is inclined laterally forward, as viewed in Fig. 1, so as not to interfere with the belt as it leaves the lowermost lap-forming roller 13, as will be readily appreciated. This lateral inclining of the chute also ensures a delivery of the material to one side of the carriage.

Mounted transversely of the carriage 12, and extending longitudinally through the lap roller supporting sleeves 16 and the adjacent portions of the upstanding frame members 17 of said carriage, are a plurality of stay rods 26. The headed ends of the upper one of these rods 26 engage directly against the outside of said frame members 17. The lower one of these rods 26 is of greater length than the upper one and extends at each end slightly beyond the adjacent frame member, as shown more clearly in Fig. 2.

Rotatably mounted on the opposite ends of this latter rod are a plurality of hub members 27, upon each of which are fixed a gear wheel 28 and a sprocket wheel 29. The nut or head at each end of the lower rod 26 engages directly against the outer face of the sprocket wheel 29 and the corresponding end of the hub member 27. The inner end of each of the hub members is flanged outwardly, as shown at 30, and interposed between said flanged end of each of the hub members and the adjacent portion of the frame 17 there is journalled, upon the rod 26, an upwardly extending toothed quadrant 31. The upper portion of each of these quadrants is provided with a plurality of divergent arms 32, which terminate in journal bearings 33, there being two pairs of these bearings for each quadrant, each pair being alined on an axis parallel to the transverse axis of the carriage. A shaft 34, extending transversely of the carriage from one side thereof to the other, is journalled at one end in one pair of these bearings and at its other end in the corresponding pair carried by the opposite quadrant. Another shaft 35, extending in like manner transversely of the carriage from one side thereof to the other, is journalled at one end in the other pair of bearings carried by said first-named quadrant and at its opposite end in the corresponding pair of bearings carried by the quadrant at the opposite side of the carriage. Each of these shafts, 34 and 35, is provided with pinions 36 immediately adjacent their extreme outer ends, these pinions being in constant mesh with the gear wheels 28, previously described.

Elongated cylindrical rollers 37 are fixed upon the shafts 34 and 35 intermediate the side frame members 17 of the carriage, these rollers being of substantially the same length as the lap-forming rollers 13, and are mounted between the latter, one on either side of the path of the belt as it passes from one of said lap rollers to the other, as shown more clearly in Fig. 1. The teeth of each quadrant are shown at 38 and are formed in the outer periphery of a segmental bar 39, which latter in each case is mounted upon or formed as an integral part of the two innermost journal bearings 33 of said quadrants. Another rotatable shaft 40 extends transversely of the carriage above the rollers 37 and is journalled at its opposite ends in suitable bearing members 41, this shaft having fixed thereto, adjacent each end thereof, a pinion 42, these pinions being in constant mesh with the teeth 38 of the quadrants 31. Also fixed upon the shaft 40, adjacent one end thereof, is a worm wheel 43 in constant mesh with a worm 44 suitably mounted on the corresponding side frame member of the carriage immediately above said worm. The worm is fixed upon a suitably journalled elongated operating shaft 45, which extends forwardly of the carriage and is provided with a hand operable wheel 46.

From the foregoing it will be observed that upon rotation of the wheel 46 by the operator the shaft 40 will be rotated, which will, in turn, through the meshing of the pinions 42 and the teeth of the quadrants 31, cause the latter to be rocked in one direction or the other to bring either one or the other of the rollers 37 into engagement with the portion of the belt extending between the lap rollers, the mounting of the pinions 36 being such that their engagement with the gear wheels 28 is not disturbed during this operation. Immediately upon engagement of one of the rollers 37 with the belt, as the latter passes from one lap roller to the other, the shaft on which said roller is mounted will be caused to rotate, thereby driving the sprocket wheels 29 through the pinions 36 and gear wheels 28.

Each of the flanged wheels 20ᵃ of the carriage is provided with sprocket wheels 47, and sprocket chains 48 are provided which engage the last named sprocket wheels and also the sprocket wheels 29, so that upon rotation of the latter power will be transmitted to the said flanged wheels 20ᵃ so as to propel the carriage in either one direction or the other, as will be readily understood. An adjustable bracket 49, carrying a plurality of rollers 50, is mounted on each side of the carriage for supporting the sprocket chains intermediate the sprocket wheels and for adjusting the tension thereof.

Depending from the longitudinal base members of the carriage, between the traction wheels 20ª, are brackets 51, to the lower ends of which are pivoted brake shoes 52ª, the latter being operable to engage and disengage the tracks 21 by means of the lever 52, pivoted at 53, and the interposed link member 54. The operating end of the lever 52 terminates at the forward end of the carriage immediately adjacent the power transmission operating wheel 46, and is provided with the usual grip-operated keeper 55 and cooperating ratchet quadrant 56. The brake shoes 52ª may be used to advantage in bringing the carriage to a stop when it has reached the desired position, and for holding the same against accidental movement in any of its various positions of adjustment.

Heretofore the wheels of the carriage have been of the single flange type, with the result that when the brakes were applied and one engaged in advance of the other, as is usually the case, the tendency was to twist the machine out of alinement and spread the rails, with the consequent leading off center of the belt. In the present machine this condition is provided against by the use of the special double flanged, curved tread wheels shown in the drawings, which ensure central travel at all times on the ball of the rail, and should any uneven action of the brakes occur all four wheels will function to maintain the proper alinement of the carriage.

Assuming now that it is desired to move the carriage 12 to the left, as viewed in Fig. 1, the operator will turn the wheel 46 so as to rock the quadrants in such wise as to bring the roller 37, carried on the shaft 34, into engagement with the belt, as the latter passes from the upper lap roller to the lower. This will cause the large gear wheel and sprocket wheel units to rotate in the direction of the arrow in Fig. 1, thereby causing the sprocket chain 48 to be driven in the direction which will propel the carriage in the desired direction. When it is desired to bring the carriage to a stop, the wheel 46 is operated, so that both the rollers 37 are out of engagement with the belt, and the brake shoes 52ª may then be operated to bring the carriage to a stop at the particular location desired. If it is desired to move the carriage to the right, as viewed in Fig. 1, the wheel 46 is operated to bring the roller 37, carried by the shaft 35, into engagement with the belt, whereupon the train of driving mechanism is reversely operated as compared to the operation first above described. The chute, lap-forming rollers, and all the various other parts of the mechanism being mounted upon the carriage 12 and movable as a unit therewith, it will be appreciated that adjustments of the carriage in either direction may be effected without altering the length of the belt or the tension thereof and without disturbing in any way the relative position of the chute with respect to either the belt or the carriage.

As will be appreciated, the carriage in its travel in one direction moves in the direction of travel of the belt, while in the other direction its travel is opposed to that of the belt. Therefore, in order that said carriage may be propelled at the same speed or the same distance per minute in either direction, one of the rollers 37 is made larger in diameter than the other, as shown in Fig. 1.

It will be obvious to those skilled in the art that the present improvements are susceptible to various changes and modifications; and it is accordingly not desired to limit the invention to the particular construction or arrangement of parts herein described and illustrated, except where limitations appear in the appended claims.

I claim:—

1. The combination with a conveying belt having a reversely directed lap portion therein to permit of discharge intermediate the end pulleys, and a chute for receiving such discharge, of means movable into and out of contact with the belt and actuated thereby for moving said lap portion and said chute longitudinally of said belt.

2. In conveying apparatus of the class described, a belt, means coacting with the conveying run thereof for forming a reverse lap portion therein to permit of discharge intermediate the ends of said run, a chute associated with said lap portion for receiving such discharge, a carriage on which said chute and lap-forming means are mounted, and transmission mechanism including an operating member movable into and out of contact with said belt for transmitting power from the latter to said carriage.

3. The combination with a conveying belt having a reversely directed lap portion therein to permit of discharge intermediate the end pulleys and a chute for receiving such discharge, of reversible power transmission mechanism including a pair of operating members alternately movable into and out of contact with the belt for moving said lap portion and said chute longitudinally of said belt.

4. In conveying apparatus of the class described, a belt, means coacting with the conveying run thereof for forming a reverse lap portion therein to permit of discharge intermediate the ends of said run, a chute associated with said lap portion for receiving such discharge, a carriage on which said chute and lap-forming means are mounted, and reversible transmission mechanism including means independent of said lap forming means adapted for direct engagement with said belt for transmitting power from the latter to said carriage.

5. In conveying apparatus of the class described, a belt, means coacting with the conveying run thereof for forming a reverse lap portion therein to permit of discharge intermediate the ends of said run, a chute associated with said lap portion for receiving such discharge, a carriage on which said chute and lap-forming means are mounted, a gear wheel rotatably mounted on said carriage, a sprocket wheel rotatable therewith, traction wheels for said carrier, sprocket wheels associated with certain of the latter, a drive chain coacting with all of said sprocket wheels, reversible means actuated by said belt for driving said gear wheel, said last-named means comprising drive rollers, one on either side of said belt, an oscillatory toothed quadrant upon which said rollers are mounted, means for transmitting power from either of said rollers to said gear wheel, and means for oscillating said quadrant to engage either of said rollers with said belt.

6. In conveying apparatus of the class described, a belt, means coacting with the conveying run thereof for forming a reverse lap-portion therein to permit of discharge intermediate the ends of said run, a chute associated with said lap portion for receiving such discharge, a carriage on which said chute and lap-forming means are mounted, a gear wheel rotatably mounted on said carriage, a sprocket wheel rotatable therewith, traction wheels for said carrier, sprocket wheels associated with certain of the latter, a drive chain coacting with all of said sprocket wheels, reversible means actuated by said belt for driving said gear wheel, said last-named means comprising rollers, one on either side of said belt, an oscillatory toothed quadrant upon which said rollers are mounted, means for transmitting power from either of said rollers to said gear wheel, a worm wheel rotatably mounted on said carriage, a pinion carried thereby and meshing with the teeth of said quadrant, a worm for operating said worm wheel, and means for actuating said worm to move either of said rollers into engagement with said belt.

7. In conveying apparatus of the class described, a belt, means coacting with the conveying run thereof for forming a reverse lap portion therein to permit of discharge intermediate the ends of said run, a chute associated with said lap portion for receiving such discharge, a carriage on which said chute and lap-forming means are mounted, transmission mechanism coacting with said belt intermediate said lap forming means for transmitting power from said belt to said carriage, and a brake for controlling the movements of the latter.

8. In conveying apparatus of the class described, a belt, means coacting with the conveying run thereof for forming a reverse lap portion therein to permit of discharge intermediate the ends of said run, a chute associated with said lap portion for receiving such discharge, a carriage on which said chute and lap-forming means are mounted, a gear wheel rotatably mounted on said carriage, a sprocket wheel rotatable therewith, traction wheels for said carrier, sprocket wheels associated with certain of the latter, a drive chain coacting with all of said sprocket wheels, reversible means actuated by said belt for driving said gear wheel, said last-named means comprising rollers, one on either side of said belt, an oscillatory toothed quadrant upon which said rollers are mounted, means for transmitting power from either of said rollers to said gear wheel, a worm wheel rotatably mounted on said carriage, a pinion carried thereby and meshing with the teeth of said quadrant, a worm for operating said worm wheel, and means for actuating said worm to move either of said rollers into engagement with said belt, one of said rollers being of larger diameter than the other to ensure travel of said carriage at the same speed in either direction.

9. In conveying apparatus of the class described, a belt, means coacting with the conveying run thereof for forming a reverse lap portion therein to permit of discharge intermediate the ends of said run, a chute associated with said lap portion for receiving such discharge, a carriage on which said chute and lap-forming means are mounted, and reversible transmission mechanism coacting with said belt for transmitting power from the latter to said carriage, said mechanism including rollers adapted to be driven from said belt, one of said rollers being larger in diameter than the other to ensure travel of said carriage at the same speed in either direction.

10. The combination with a conveying belt having a reversely directed lap portion therein to permit of discharge intermediate the end pulleys and a chute for receiving such discharge, of means adapted to be actuated by the said lap portion for moving the latter longitudinally of said belt.

11. In conveying apparatus of the class described, a belt, means coacting with the conveying run thereof for forming a reverse lap portion therein to permit of discharge intermediate the ends of said run, a chute associated with said lap portion for receiving such discharge, a carriage on which said chute and lap-forming means are mounted, and means engageable with the belt intermediate said lap forming means for transmitting power from said belt to said carriage.

12. In conveying apparatus of the class described, a belt, a carriage, pulleys for said belt, certain of the latter being mounted on said carriage, and means independent of said pulleys engageable with said belt for transmitting power from the latter to said carriage.

13. The combination with an endless belt conveyer, of a self-propelled tripper comprising a carriage, pulleys journaled thereon around which said belt passes, and means engageable with said belt for transmitting power therefrom to said carriage.

14. A self-propelled tripper of the class described comprising side frame members, a stay rod extending between said frame members, a hollow non-rotatable sleeve enclosing said rod, anti-friction bearing members carried by said sleeve, and a conveyer belt pulley journaled on said bearing members.

In testimony whereof, I have subscribed my name.

LEWIS A. STINSON.